(12) United States Patent
Atmeh (10) Patent No.: US 11,755,469 B2
(45) Date of Patent: Sep. 12, 2023

(54) SYSTEM FOR EXECUTING STRUCTURED TESTS ACROSS A FLEET OF AUTONOMOUS VEHICLES

(71) Applicant: Argo AI, LLC, Pittsburgh, PA (US)

(72) Inventor: Ghassan Atmeh, Grosse Pointe Woods, MI (US)

(73) Assignee: ARGO AI, LLC, Pittsburgh, PA (US)

( * ) Notice: Subject to any disclaimer, the term of this patent is extended or adjusted under 35 U.S.C. 154(b) by 328 days.

(21) Appl. No.: 17/030,702

(22) Filed: Sep. 24, 2020

(65) Prior Publication Data

US 2022/0091973 A1    Mar. 24, 2022

(51) Int. Cl.
*G05D 1/00* (2006.01)
*G06F 11/36* (2006.01)
*G06F 11/30* (2006.01)
*G06F 11/34* (2006.01)

(52) U.S. Cl.
CPC ....... *G06F 11/3692* (2013.01); *G05D 1/0088* (2013.01); *G06F 11/3086* (2013.01); *G06F 11/3476* (2013.01); *G05D 2201/0213* (2013.01); *G06F 2201/835* (2013.01)

(58) Field of Classification Search
CPC .......... G05D 1/0088; G05D 2201/0213; G06F 11/3086; G06F 11/3476; G06F 11/3688; G06F 11/3692; G06F 2201/835
See application file for complete search history.

(56) References Cited

U.S. PATENT DOCUMENTS 9,836,895 B1 * 12/2017 Nygaard ............. G05D 1/0088
10,459,444 B1   10/2019 Kentley-Klay
10,556,703 B1 *  2/2020 Skola ................... G08G 5/0065
(Continued)

FOREIGN PATENT DOCUMENTS

CN         111667605 A    9/2020
KR   10-2020-0094650 A    8/2020

OTHER PUBLICATIONS

Korus, Jan-Dominik et al., "A Method for Identifying Most Significant Vehicle Parameters for Controller Performance of Autonomous Driving Functions," SAE Int. J. Adv. & Curr. Prac. in Mobility 1(3):996-1005, 2019.

(Continued)

*Primary Examiner* — Hunter B Lonsberry
*Assistant Examiner* — Matthew J. Reda
(74) *Attorney, Agent, or Firm* — FOX ROTHSCHILD, LLP (57) ABSTRACT

A system for testing an autonomous vehicle obtains a list of required tests the autonomous vehicle is to run, where each test is part of a commissioning process for the autonomous vehicle. The system causes the list to be displayed on a display device of the autonomous vehicle, receives a selection of a selected test from an operator of the autonomous vehicle, and receives a test input profile associated with the selected test. The system causes the autonomous vehicle to execute at the instructions of the test input profile, and logs response data to one or more log files. During execution of the test instructions, the system generates metadata associated with the selected test. The system logs the metadata to the one or more log files, and transmits at least a portion of the one or more log files to an electronic device located remotely from the autonomous vehicle.

17 Claims, 8 Drawing Sheets

(56) References Cited

U.S. PATENT DOCUMENTS

| | | | |
|---|---|---|---|
| 10,599,155 B1* | 3/2020 | Konrardy | B60W 10/04 |
| 10,599,546 B1 | 3/2020 | Walther et al. | |
| 2019/0009789 A1* | 1/2019 | Zhang | G06V 20/588 |
| 2019/0011927 A1* | 1/2019 | Mou | G06T 7/254 |
| 2019/0031201 A1* | 1/2019 | Lundsgaard | B60W 50/0098 |
| 2019/0079536 A1 | 3/2019 | Zhu et al. | |
| 2019/0001298 A1 | 5/2019 | Goldberg | |
| 2019/0130056 A1 | 5/2019 | Tascione et al. | |
| 2019/0278698 A1 | 9/2019 | Ahner et al. | |
| 2019/0303759 A1 | 10/2019 | Farabet et al. | |
| 2020/0000269 A1 | 1/2020 | Kolter et al. | |
| 2020/0027292 A1 | 1/2020 | Watson et al. | |
| 2020/0356845 A1* | 11/2020 | Pfeil | G06N 3/063 |
| 2021/0165375 A1* | 6/2021 | Zhao | G05B 13/027 |
| 2021/0179109 A1* | 6/2021 | Mori | G01M 17/025 |
| 2022/0126871 A1* | 4/2022 | Li | B60W 60/0017 |

OTHER PUBLICATIONS

Menzel, Till, et al. "Scenarios for Development, Test and Validation of Automated Vehicles," Institute of Control Engineering, cs.SE, Apr. 27, 2018.

Macek, K. et al. "Dynamics Modeling and Parameter Identification for Autonomous Vehicle Navigation," Swiss Federal Institute of Technology Zurich, Switzerland.

* cited by examiner

600 — #test_start: 315969225.302542988
602 — Test Speed (mph): 35.00
604 — Actuator: Steering Left
606 — Profile: Ramp
608 — Magnitude: 38.34
610 — Rate (1/sec): 32.05
612 — Front left mass (kg): 561.09
Front right mass (kg): 550.66
Rear left mass (kg): 501.22
Rear right mass (kg): 468.11
614 — GPS Location: (42.2989,-83.2202)
616 — #test_end: 315969254.215637899

SYSTEM FOR EXECUTING STRUCTURED TESTS ACROSS A FLEET OF AUTONOMOUS VEHICLES

BACKGROUND

The performance of a motion control system for an autonomous vehicle that relies on physical models is directly affected by the quality of those models. Physical models for vehicle actuators, such as the powertrain, brake, or steering, as well as models of the vehicle's motion response, play an important role in controlling the vehicle's motion and the building of simulation models.

Typically, there are multiple models required for controlling an autonomous vehicle. To identify the parameters for those models, hundreds of tests might be required per vehicle. For an autonomous vehicle fleet, the number of tests that need to run to collect data can grow substantially. In addition to a large number of tests involved, the results of these tests are typically stored in log files that log all of the data for an autonomous vehicle so specific data segments of interest need to be specifically searched for, categorized, and then used for running parameter identification algorithms to generate relevant model parameters.

Most work to date has focused on a procedure for one class of models, or a procedure for using a certain algorithm to identify parameters of different models. However, little attention has been given to developing a framework for running structured tests at scale (e.g., across a fleet of autonomous vehicles), and automatically isolating data for a specific test from all of the data that is logged.

This document describes methods and systems that are directed to addressing the problems described above, and/or other issues.

SUMMARY

In various embodiments, a system for testing an autonomous vehicle includes an on-board computing system of an autonomous vehicle that includes an electronic device, and a computer-readable storage medium having one or more programming instructions that, when executed, cause the electronic device to perform one or more actions. The system obtains a list of one or more required tests the autonomous vehicle is to run, where each of the one or more required tests is part of a commissioning process for the autonomous vehicle. The system causes the list to be displayed on a display device of the autonomous vehicle, receives a selection of a selected test from an operator of the autonomous vehicle, and receives a test input profile associated with the selected test. The test input profile includes one or more instructions for the autonomous vehicle to execute to perform the selected test. The system causes the autonomous vehicle to execute at least a portion of the one or more instructions of the test input profile, and logs response data to one or more log files. The response data includes data associated with the autonomous vehicle's response to executing the at least a portion of the one or more instructions. During execution of the one or more test instructions, the system generates metadata associated with the selected test, where the metadata includes a start timestamp that corresponds to a time when the selected test begins and an end timestamp that corresponds to a time when the selected test ends. The system logs the metadata to the one or more log files, and transmits at least a portion of the one or more log files to an electronic device located remotely from the autonomous vehicle.

In response to receiving an input from the operator, the system may cause the autonomous vehicle to operate at a test speed associated with the selected test. The metadata may include a test type associated with the selected test. The metadata may include an indication that the selected test is part of the commissioning process.

The system may log as part of the metadata one or more annotations received from the operator during execution of the selected test.

In some embodiments, the system may detect one or more operation interventions that occur during execution of the one or more test instructions, and log data associated with each operation invention as part of the metadata.

In some embodiments, a second electronic device located remotely from the autonomous vehicle may store at least a portion of the received response data and at least a portion of the metadata in one or more data stores.

The system may detect metadata associated with the selected test, identify one or more segments of the response data that corresponds to the selected test based on the metadata, and execute one or more parameter identification algorithms on the one or more segments of the response data.

The system may identify one or more segments of the response data that corresponds to the selected test based on the metadata by identifying response data having a timestamp that occurs between the start timestamp and the end timestamp.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to." Definitions for additional terms that are relevant to this document are included at the end of this Detailed Description.

Figure 1:
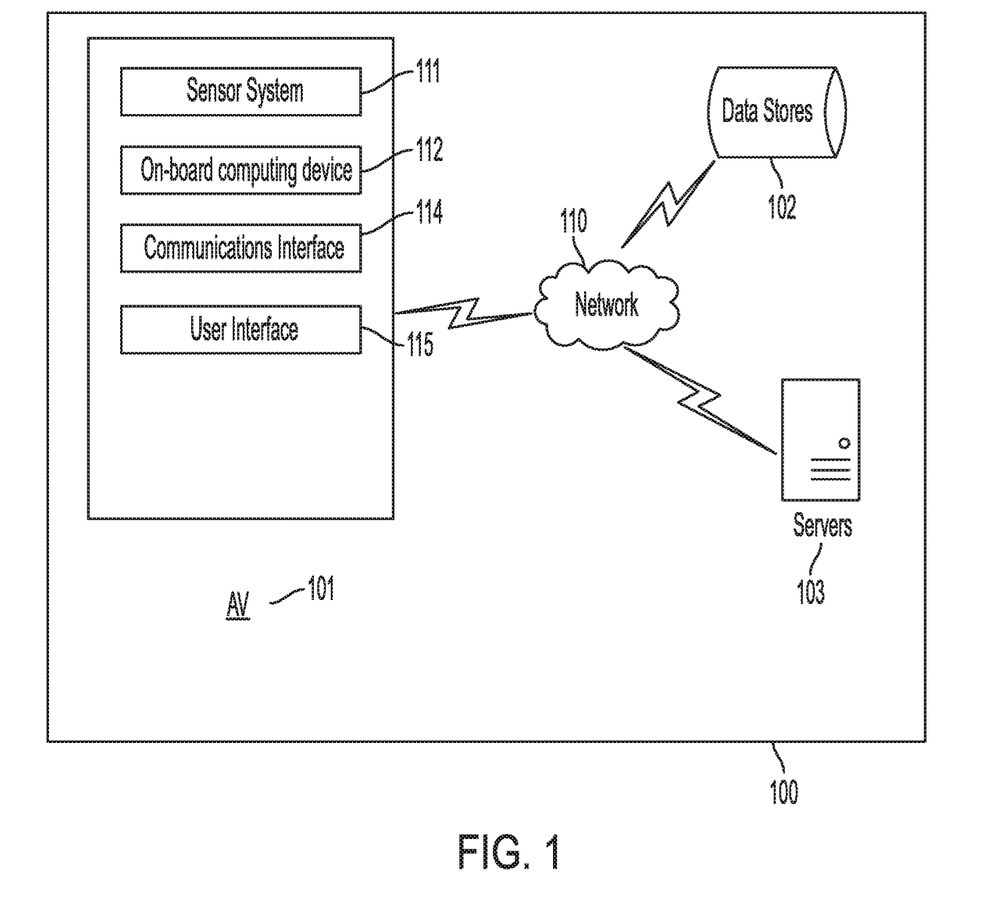
FIG. 1 is a block diagram illustrating an example autonomous vehicle system.

FIG. 1 is a block diagram illustrating an example system 100 that includes an autonomous vehicle 101 in communication with one or more data stores 102 and/or one or more servers 103 via a network 110. Although there is one autonomous vehicle shown, multiple autonomous vehicles may be coupled to each other and/or coupled to data stores 102 and/or servers 103 over network 110. Network 110 may be any type of network such as a local area network (LAN), a wide area network (WAN) such as the Internet, a cellular network, a satellite network, or a combination thereof, and may be wired or wireless. Data store(s) 102 may be any kind of data stores such as, without limitation, map data store(s), traffic information data store(s), user information data store (s), point of interest data store(s), or any other type of content data store(s). Server(s) 103 may be any kind of servers or a cluster of servers, such as, without limitation, Web or cloud servers, application servers, backend servers, or a combination thereof.

As illustrated in FIG. 1, the autonomous vehicle 101 may include a sensor system 111, an on-board computing device 112, a communications interface 114, and a user interface 115. Autonomous vehicle 101 may further include certain components (as illustrated, for example, in FIG. 2) included in vehicles, such as, an engine, wheels, steering wheel, transmission, etc., which may be controlled by the on-board computing device 112 using a variety of communication signals and/or commands, such as, for example, acceleration signals or commands, deceleration signals or commands, steering signals or commands, braking signals or commands, etc.

The sensor system 111 may include one or more sensors that are coupled to and/or are included within the autonomous vehicle 101. Examples of such sensors include, without limitation, a LIDAR system, a radio detection and ranging (RADAR) system, a laser detection and ranging (LADAR) system, a sound navigation and ranging (SONAR) system, one or more cameras (e.g., visible spectrum cameras, infrared cameras, etc.), temperature sensors, position sensors (e.g., global positioning system (GPS), etc.), location sensors, fuel sensors, motion sensors (e.g., inertial measurement units (IMU), etc.), humidity sensors, occupancy sensors, or the like. The sensor data can include information that describes the location of objects within the surrounding environment of the autonomous vehicle 101, information about the environment itself, information about the motion of the autonomous vehicle 101, information about a route of the autonomous vehicle, or the like. As autonomous vehicle 101 travels over a surface, at least some of the sensors may collect data pertaining to the surface.

The LIDAR system may include a sensor configured to sense or detect objects in an environment in which the autonomous vehicle 101 is located. Generally, LIDAR system is a device that incorporates optical remote sensing technology that can measure distance to a target and/or other properties of a target (e.g., a ground surface) by illuminating the target with light. As an example, the LIDAR system may include a laser source and/or laser scanner configured to emit laser pulses and a detector configured to receive reflections of the laser pulses. For example, the LIDAR system may include a laser range finder reflected by a rotating mirror, and the laser is scanned around a scene being digitized, in one, two, or more dimensions, gathering distance measurements at specified angle intervals. The LIDAR system, for example, may be configured to emit laser pulses as a beam. Optionally, the beam may be scanned to generate two dimensional or three dimensional range matrices. In an example, the range matrices may be used to determine distance to a given vehicle or surface by measuring time delay between transmission of a pulse and detection of a respective reflected signal. In some examples, more than one LIDAR system may be coupled to the first vehicle to scan a complete 360° horizon of the first vehicle. The LIDAR system may be configured to provide to the computing device a cloud of point data representing the surface(s), which have been hit by the laser. The points may be represented by the LIDAR system in terms of azimuth and elevation angles, in addition to range, which can be converted to (X, Y, Z) point data relative to a local coordinate frame attached to the vehicle. Additionally, the LiDAR may be configured to provide intensity values of the light or laser reflected off the surfaces that may be indicative of a surface type. In examples, the LiDAR system may include components such as light (e.g., laser) source, scanner and optics, photo-detector and receiver electronics, and position and navigation system. In an example, The LiDAR system may be configured to use ultraviolet (UV), visible, or infrared light to image objects and can be used with a wide range of targets, including non-metallic objects. In one example, a narrow laser beam can be used to map physical features of an object with high resolution.

It should be noted that the LiDAR systems for collecting data pertaining to the surface may be included in systems other than the autonomous vehicle 101 such as, without limitation, other vehicles (autonomous or driven), robots, satellites, etc.

Figure 2:
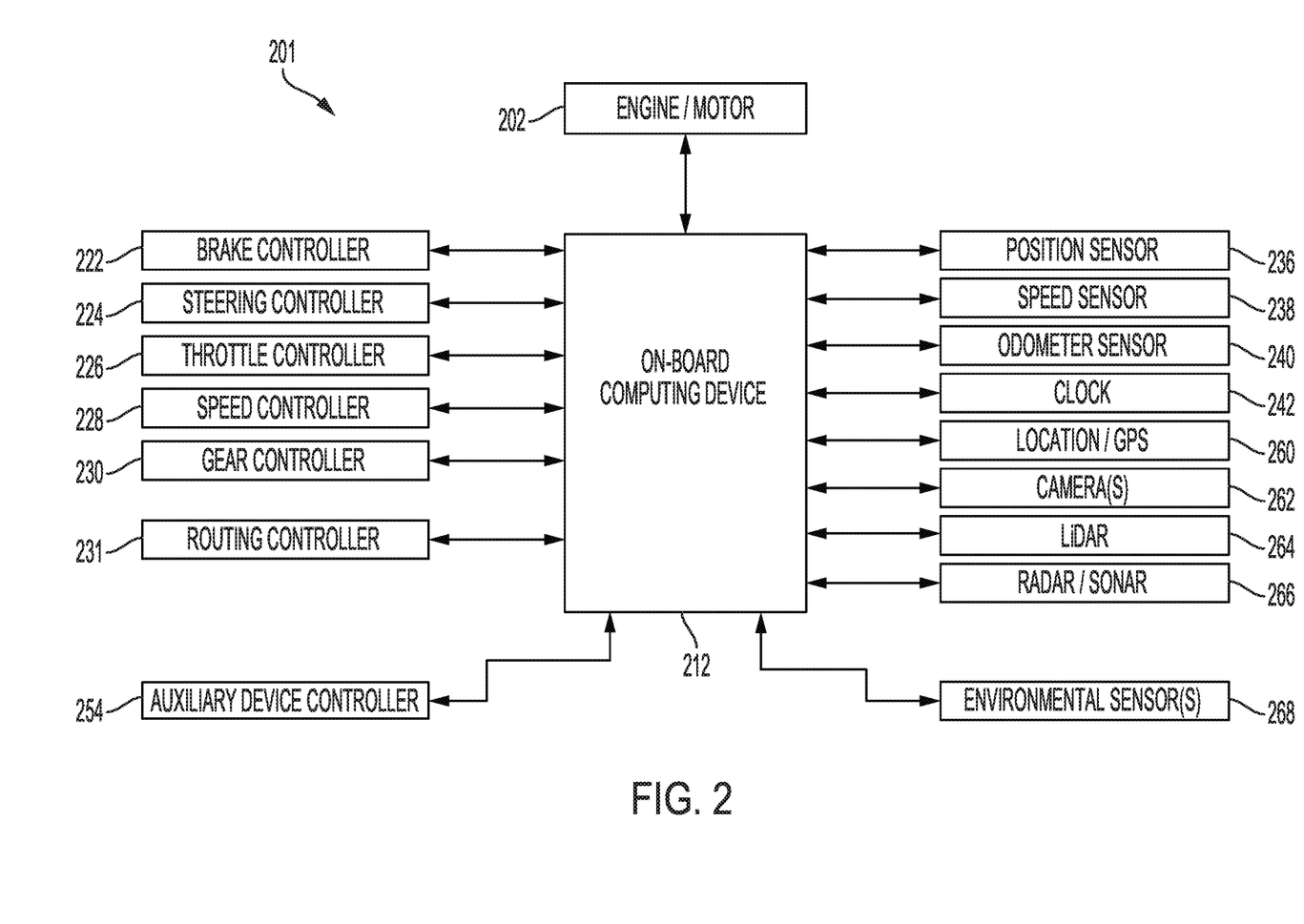
FIG. 2 illustrates an example vehicle controller system.

FIG. 2 illustrates an example system architecture for a vehicle 201, such as the autonomous vehicle 101 of FIG. 1. The vehicle 201 may include an engine or motor 202 and various sensors for measuring various parameters of the vehicle and/or its environment. Operational parameter sensors that are common to both types of vehicles include, for example: a position sensor 236 such as an accelerometer, gyroscope and/or inertial measurement unit; a speed sensor 238; and an odometer sensor 240. The vehicle 101 also may have a clock 242 that the system architecture uses to determine vehicle time during operation. The clock 242 may be encoded into the vehicle on-board computing device 212, it may be a separate device, or multiple clocks may be available.

The vehicle 201 also may include various sensors that operate to gather information about the environment in which the vehicle is traveling. These sensors may include, for example: a location sensor 260 such as a GPS device; object detection sensors such as one or more cameras 262; a LiDAR sensor system 264; and/or a radar and or and/or a sonar system 266. The sensors also may include environmental sensors 268 such as a precipitation sensor and/or ambient temperature sensor. The object detection sensors may enable the vehicle 201 to detect objects that are within a given distance or range of the vehicle 201 in any direction, while the environmental sensors collect data about environmental conditions within the vehicle's area of travel. The system architecture will also include one or more cameras 262 for capturing images of the environment.

During operations, information is communicated from the sensors to an on-board computing device 212. The on-board computing device 212 analyzes the data captured by the sensors and optionally controls operations of the vehicle based on results of the analysis. For example, the on-board computing device 212 may control braking via a brake controller 222; direction via a steering controller 224; speed and acceleration via a throttle controller 226 (in a gas-powered vehicle) or a motor speed controller 228 (such as a current level controller in an electric vehicle); a differential gear controller 230 (in vehicles with transmissions); and/or other controllers such as an auxiliary device controller 254.

Geographic location information may be communicated from the location sensor 260 to the on-board computing device 212, which may then access a map of the environment that corresponds to the location information to determine known fixed features of the environment such as streets, buildings, stop signs and/or stop/go signals. Captured images from the cameras 262 and/or object detection information captured from sensors such as a LiDAR system 264 is communicated from those sensors) to the on-board computing device 212. The object detection information and/or captured images may be processed by the on-board computing device 212 to detect objects in proximity to the vehicle 201. In addition or alternatively, the vehicle 201 may transmit any of the data to a remote server system 103 (FIG. 1) for processing. Any known or to be known technique for making an object detection based on sensor data and/or captured images can be used in the embodiments disclosed in this document.

The on-board computing device 212 may obtain, retrieve, and/or create map data that provides detailed information about the surrounding environment of the autonomous vehicle 201. The on-board computing device 212 may also determine the location, orientation, pose, etc. of the AV in the environment (localization) based on, for example, three dimensional position data (e.g., data from a GPS), three dimensional orientation data, predicted locations, or the like. For example, the on-board computing device 212 may receive GPS data to determine the AV's latitude, longitude and/or altitude position. Other location sensors or systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise than absolute geographical location. The map data can provide information regarding: the identity and location of different roadways, road segments, lane segments, buildings, or other items; the location, boundaries, and directions of traffic lanes (e.g., the location and direction of a parking lane, a turning lane, a bicycle lane, or other lanes within a particular roadway) and metadata associated with traffic lanes; traffic control data (e.g., the location and instructions of signage, traffic lights, or other traffic control devices); and/or any other map data that provides information that assists the on-board computing device 212 in analyzing the surrounding environment of the autonomous vehicle 201.

In certain embodiments, the map data may also include reference path information that correspond to common patterns of vehicle travel along one or more lanes such that the motion of the object is constrained to the reference path (e.g., locations within traffic lanes on which an object commonly travels). Such reference paths may be pre-defined such as the centerline of the traffic lanes. Optionally, the reference path may be generated based on a historical observations of vehicles or other objects over a period of time (e.g., reference paths for straight line travel, lane merge, a turn, or the like).

In certain embodiments, the on-board computing device 212 may also include and/or may receive information relating to the trip or route of a user, real-time traffic information on the route, or the like.

The on-board computing device 212 may include and/or may be in communication with a routing controller 231 that generates a navigation route from a start position to a destination position for an autonomous vehicle. The routing controller 231 may access a map data store to identify possible routes and road segments that a vehicle can travel on to get from the start position to the destination position. The routing controller 231 may score the possible routes and identify a preferred route to reach the destination. For example, the routing controller 231 may generate a navigation route that minimizes Euclidean distance traveled or other cost function during the route, and may further access the traffic information and/or estimates that can affect an amount of time it will take to travel on a particular route. Depending on embodiment, the routing controller 231 may generate one or more routes using various routing methods, such as Dijkstra's algorithm, Bellman-Ford algorithm, or other algorithms. The routing controller 231 may also use the traffic information to generate a navigation route that reflects expected conditions of the route (e.g., current day of the week or current time of day, etc.), such that a route generated for travel during rush-hour may differ from a route generated for travel late at night. The routing controller 231 may also generate more than one navigation route to a destination and send more than one of these navigation routes to a user for selection by the user from among various possible routes.

In various embodiments, an on-board computing device 212 may determine perception information of the surrounding environment of the autonomous vehicle 201. Based on the sensor data provided by one or more sensors and location information that is obtained, the on-board computing device 212 may determine perception information of the surrounding environment of the autonomous vehicle 201. The perception information may represent what an ordinary driver would perceive in the surrounding environment of a vehicle. The perception data may include information relating to one or more objects in the environment of the autonomous vehicle 201. For example, the on-board computing device 212 may process sensor data (e.g., LIDAR or RADAR data, camera images, etc.) in order to identify objects and/or features in the environment of autonomous vehicle 201. The objects may include traffic signals, road way boundaries, other vehicles, pedestrians, and/or obstacles, etc. The on-board computing device 212 may use any now or hereafter known object recognition algorithms, video tracking algorithms, and computer vision algorithms (e.g., track objects frame-to-frame iteratively over a number of time periods) to determine the perception.

In some embodiments, the on-board computing device 212 may also determine, for one or more identified objects in the environment, the current state of the object. The state information may include, without limitation, for each object: current location; current speed and/or acceleration, current heading; current pose; current shape, size, or footprint; type (e.g., vehicle vs. pedestrian vs. bicycle vs. static object or obstacle); and/or other state information.

The on-board computing device 212 may perform one or more prediction and/or forecasting operations. For example, the on-board computing device 212 may predict future locations, trajectories, and/or actions of one or more objects. For example, the on-board computing device 212 may predict the future locations, trajectories, and/or actions of the objects based at least in part on perception information (e.g., the state data for each object comprising an estimated shape and pose determined as discussed below), location information, sensor data, and/or any other data that describes the past and/or current state of the objects, the autonomous vehicle 201, the surrounding environment, and/or their relationship(s). For example, if an object is a vehicle and the current driving environment includes an intersection, the on-board computing device 212 may predict whether the object will likely move straight forward or make a turn. If the perception data indicates that the intersection has no traffic light, the on-board computing device 212 may also predict whether the vehicle may have to fully stop prior to enter the intersection.

In various embodiments, the on-board computing device 212 may determine a motion plan for the autonomous vehicle. For example, the on-board computing device 212 may determine a motion plan for the autonomous vehicle based on the perception data and/or the prediction data. Specifically, given predictions about the future locations of proximate objects and other perception data, the on-board computing device 212 can determine a motion plan for the autonomous vehicle 201 that best navigates the autonomous vehicle relative to the objects at their future locations.

In one or more embodiments, the on-board computing device 212 may receive predictions and make a decision regarding how to handle objects in the environment of the autonomous vehicle 201. For example, for a particular object (e.g., a vehicle with a given speed, direction, turning angle, etc.), the on-board computing device 212 decides whether to overtake, yield, stop, and/or pass based on, for example, traffic conditions, map data, state of the autonomous vehicle, etc. Furthermore, the on-board computing device 212 also plans a path for the autonomous vehicle 201 to travel on a given route, as well as driving parameters (e.g., distance, speed, and/or turning angle). That is, for a given object, the on-board computing device 212 decides what to do with the object and determines how to do it. For example, for a given object, the on-board computing device 212 may decide to pass the object and may determine whether to pass on the left side or right side of the object (including motion parameters such as speed). The on-board computing device 212 may also assess the risk of a collision between a detected object and the autonomous vehicle 201. If the risk exceeds an acceptable threshold, it may determine whether the collision can be avoided if the autonomous vehicle follows a defined vehicle trajectory and/or implements one or more dynamically generated emergency maneuvers is performed in a pre-defined time period (e.g., N milliseconds). If the collision can be avoided, then the on-board computing device 212 may execute one or more control instructions to perform a cautious maneuver (e.g., mildly slow down, accelerate, change lane, or swerve). In contrast, if the collision cannot be avoided, then the on-board computing device 112 may execute one or more control instructions for execution of an emergency maneuver (e.g., brake and/or change direction of travel).

As discussed above, planning and control data regarding the movement of the autonomous vehicle is generated for execution. The on-board computing device 212 may, for example, control braking via a brake controller; direction via a steering controller; speed and acceleration via a throttle controller (in a gas-powered vehicle) or a motor speed controller (such as a current level controller in an electric vehicle); a differential gear controller (in vehicles with transmissions); and/or other controllers.

In the various embodiments discussed in this document, the description may state that the vehicle or a controller included in the vehicle (e.g., in an on-board computing system) may implement programming instructions that cause the vehicle and/or a controller to make decisions and use the decisions to control operations of the vehicle. However, the embodiments are not limited to this arrangement, as in various embodiments the analysis, decision making and or operational control may be handled in full or in part by other computing devices that are in electronic communication with the vehicle's on-board computing device and/or vehicle control system. Examples of such other computing devices include an electronic device (such as a smartphone) associated with a person who is riding in the vehicle, as well as a remote server that is in electronic communication with the vehicle via a wireless communication network. The processor of any such device may perform the operations that will be discussed below.

Referring back to FIG. 1, the communications interface 114 may be configured to allow communication between autonomous vehicle 101 and external systems, such as, for example, external devices, sensors, other vehicles, servers, data stores, databases etc. Communications interface 114 may utilize any now or hereafter known protocols, protection schemes, encodings, formats, packaging, etc. such as, without limitation, Wi-Fi, an infrared link, Bluetooth, etc. User interface system 115 may be part of peripheral devices implemented within vehicle 101 including, for example, a keyword, a touch screen display device, a microphone, and a speaker, etc.

An autonomous vehicle's motion control system relies on various physical models, and the performance of this system is directly affected by the quality of these models. For example, physical models for vehicle actuators (e.g., the powertrain, brake, or steering), as well as models of the vehicle's motion response play an important role in controlling the autonomous vehicle's motion. They are also important for building simulation models.

A model's structure typically includes a number of parameters that represent one or more physical properties of the motion of an autonomous vehicle. As an example, the yaw mass moment of inertia may be a parameter that may represent an autonomous vehicle's resistance to turning. This parameter may play a large role in modeling the autonomous vehicle's turning behavior.

A fleet of autonomous vehicles may share the same autonomy software stack and vehicle platform. As such, a large number of model parameters may be needed to allow the autonomous vehicle's motion control to operate efficiently. The models to which these parameters correspond may be used to report on the fleet readiness for autonomy. For example, model parameters may be estimated for newly built vehicles to commission them for public road use. Similar parameter estimation tests may be run over the lifetime of a fleet to spot variations and/or anomalies in the fleet behavior. For example, one or more parameter estimation tests may be run to detect one or more changes in an autonomous vehicle's brake system performance over the lifetime of the vehicle.

Figure 3:
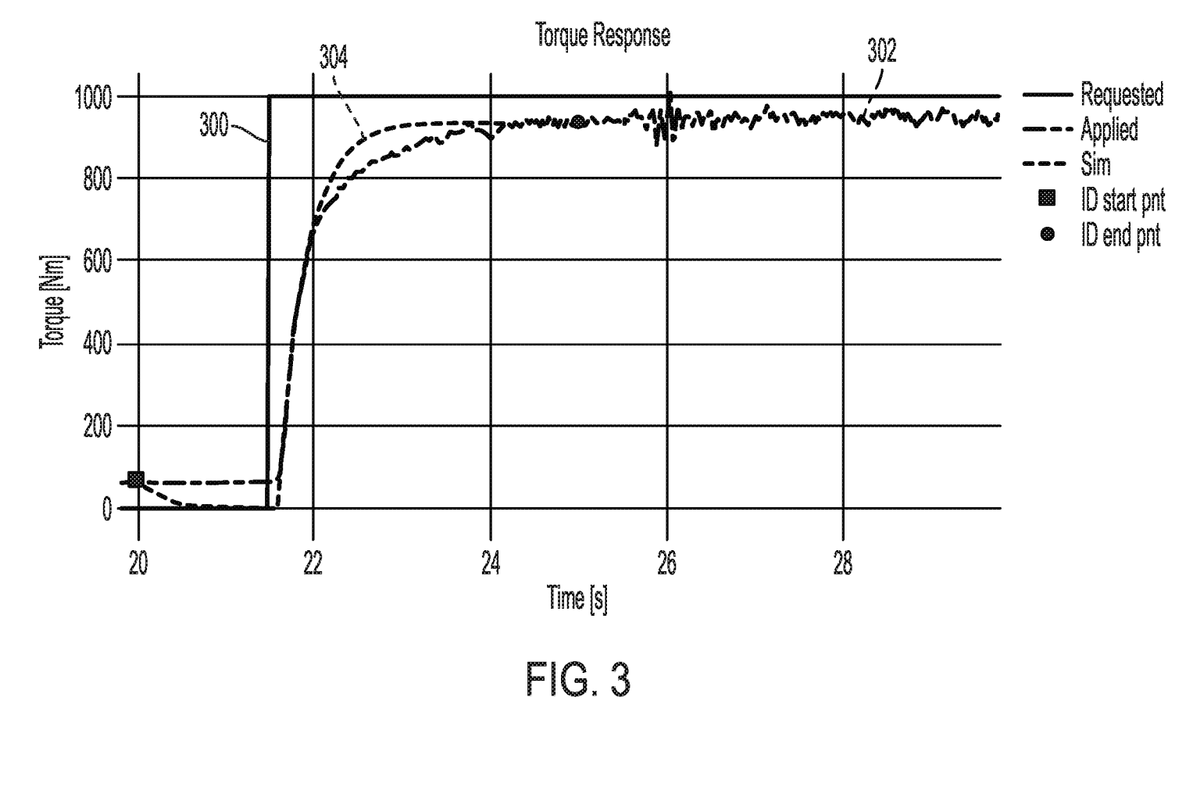
FIG. 3 illustrates an example torque step input request and estimate torque response from an example test.

To identify relevant model parameters, vehicle data for one or more structured open loop tests may be collected. A structured open loop test may be a test where an autonomous vehicle is commanded with a specific input profile and the autonomous vehicle's response is recorded. An example of a structured loop test includes sending a torque step input request to an autonomous vehicle's powertrain and recording the autonomous vehicle's longitudinal acceleration. This longitudinal acceleration may be converted to an estimated applied torque to the wheels. FIG. 3 illustrates an example torque step input request 300 and the estimated torque response 302 from an example test according to an embodiment. Using this data and an assumed model structure, one or more model parameters may be estimated. A simulated response from the model may be overlaid 304. Additional and/or alternate structured open loop tests may be used within the scope of this disclosure.

As another example, a structured open loop test may test one or more other components, systems, or subsystems of an autonomous vehicle. For example, tests may be used to test operation of an autonomous vehicle's tires, suspension system, and/or the like. For instance, a test may be used to test operation of at least a part of an autonomous vehicle's steering wheel actuation system. An input profile may include information pertaining to one or more commanded steering wheel angle profiles (e.g., step, ramp, sine wave). The response of the steering system (e.g., the measured steering wheel angle) may be measured by in response to applying the input profile.

As another example, a test may be used to test operation of at least a part of an autonomous vehicle's dynamics system using a vehicle lateral dynamics model. Input to the model may be the measured steering wheel angle, and the output is the yaw rate and the lateral velocity. Typically, tests like this one may use a constant steering wheel angle profile to generate outputs of steady-state cornering that can be helpful in identifying the tire stiffness parameter that dictates the amount of force generated by the tires. Other input profiles may include, for example, quasi-steady ramp inputs of steering wheel angle.

FIG. 3 illustrates data for one model and one input profile. Typically, there are multiple models that need to be identified and different input profiles and test conditions to be considered. This can easily grow into a set of hundreds of tests per vehicle, and a substantial number of tests across a fleet of autonomous vehicles. As such, a more scalable framework is needed.

Figure 4:
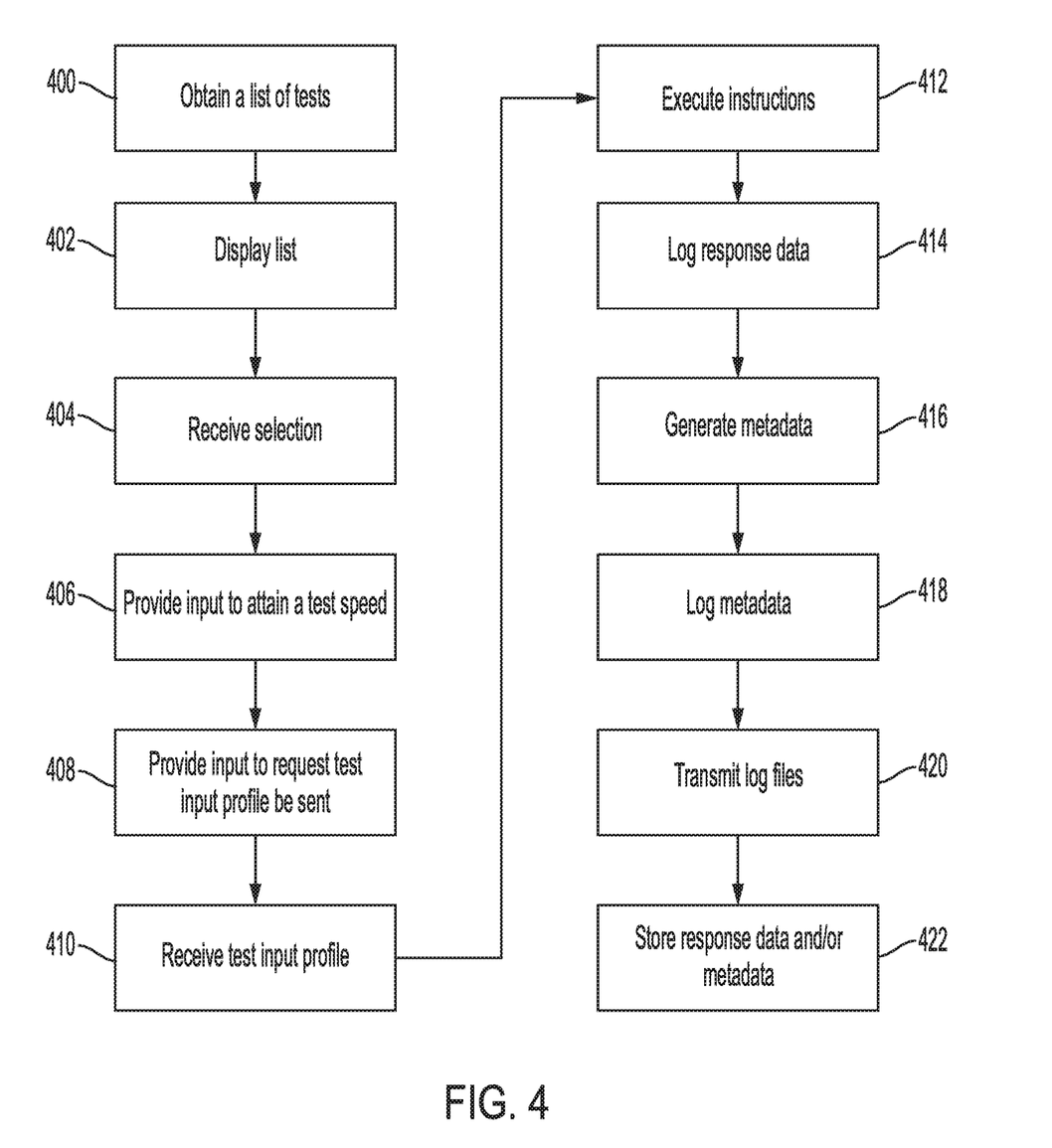
FIG. 4 illustrates a flow chart of an example method of executing one or more tests across a fleet of autonomous vehicles.

FIG. 4 illustrates a flow chart of an example method of executing one or more tests across a fleet of autonomous vehicles according to various embodiments. As illustrated by FIG. 4, an on-board computing system of an autonomous vehicle may obtain 400 a list of one or more required tests that the autonomous vehicle is to run. The autonomous vehicle may be part of a fleet of autonomous vehicles. In various embodiments one or more of the required tests may be ones that are required as part of a commissioning process for the autonomous vehicle.

An autonomous vehicle may obtain 400 a list of one or more required tests from one or more data stores. For example, one or more data stores of the autonomous vehicle (or to which the autonomous vehicle has access) may store a list of one or more required tests for the autonomous vehicles. The list may identify one or more required tests by a unique identifier such as a code, a name or other identifier.

In various embodiments, an autonomous vehicle may have a framework for running one or more structured open loop tests. This framework may be a software tool that may be operated in an autonomous vehicle in connection with one or more hardware and/or firmware components of the autonomous vehicle to run one or more structured tests. The framework may utilize a Test Description File (TDF) that may define all of the tests required to run for an autonomous vehicle. In various embodiments, a list of available tests may be displayed 402 for an autonomous vehicle operator to see. The list may be displayed 402 on a display device of the autonomous vehicle such as, for example, a screen or other display device. For example, once a TDF is loaded, a list of available tests may be displayed 402 on a display device of the autonomous vehicle.

Figure 5:
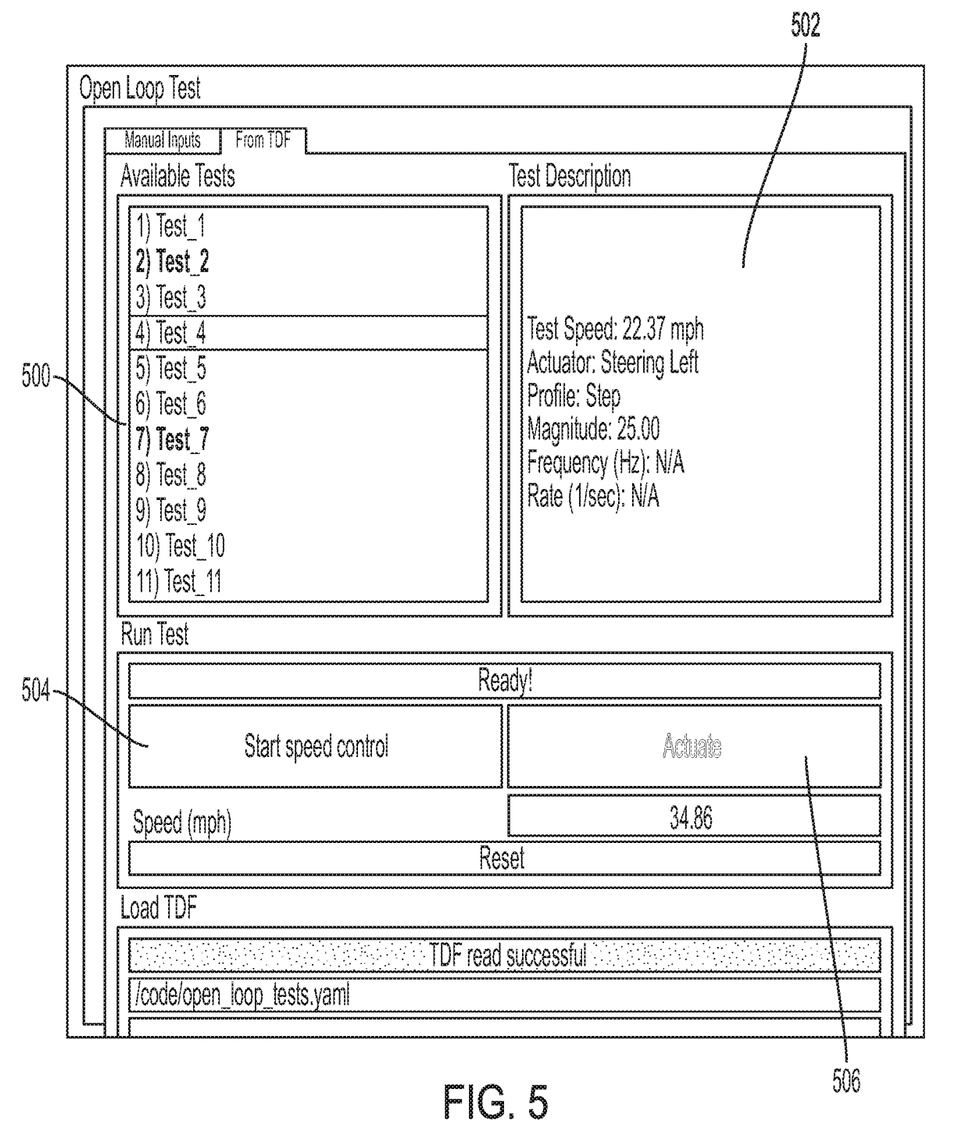
FIG. 5 illustrates an example user interface.

FIG. 5 illustrates an example user interface for a framework for running one or more structured open loop tests. As illustrated by FIG. 5, a portion of the user interface 500 includes a listing of available tests. Another portion of the user interface 502 includes a description of one or more of the available tests.

Referring back to FIG. 4, an on-board computing system of the autonomous vehicle may receive 404 a selection of a test from an operator of the autonomous vehicle. For example, an operator may use a keyboard, mouse or other input device to select a test from the list of available tests.

In various embodiments, an autonomous operator may provide 406 input to the framework that instructs the autonomous vehicle to attain a test speed associated with the selected test. For example, one or more of the tests may have a speed or velocity (or minimum speed or velocity) that an autonomous vehicle must attain before the test can be run. An operator may provide 406 such input via the "start speed control" button 504 of the user interface illustrated in FIG. 5. Additional and/or alternate input mechanisms may be used within the scope of this disclosure. In response to receiving such input, the on-board computing system may cause the autonomous vehicle to operate at the test speed associated with the selected test.

Once an autonomous vehicle attains its relevant test speed, an operator may provide 408 input to the framework that causes the autonomous vehicle to request a test input profile for the selected test be sent to the autonomous vehicle. A test input profile may include one or more instructions that the autonomous vehicle must perform in order to successfully execute the associated test. The instructions may cause the autonomous vehicle to obtain certain sensor measurements, change its speed, or otherwise adjust one or more of its operational or performance parameters. In various embodiments, a test input profile may include timing information that can be used to generate and log metadata.

For example, an autonomous vehicle may request that an electronic device located remotely from the autonomous vehicle send a test input profile to the autonomous vehicle. Referring to FIG. 5, an operator may select the "Actuate" button 506 of the user interface to request a test input profile be sent. Additional and/or alternate input mechanisms may be used within the scope of this disclosure.

The autonomous vehicle may receive 410 the requested test input profile for the selected test. The autonomous vehicle may execute 412 at least a portion of the one or more instructions pertaining to the received test input profile. While the autonomous vehicle is executing a test input profile, the on-board logging system of the autonomous vehicle may log 414 response data to one or more log files. Response data may include data associated with the autonomous vehicle's response to executing at least a portion of the instructions of the test input profile.

During execution of a test input profile, an autonomous vehicle may generate 416 metadata associated with the selected test. In various embodiments the metadata may include a timestamp that corresponds to a start time of the test, a timestamp that corresponds to an end time of the test, and/or the like. The metadata may include an indication of a test type associated with the selected test. Example test types may include, without limitation, a commissioning test. In various embodiments, metadata may include test speed, actuation type (e.g., steering, accelerator, brake), test profile (e.g., step, ramp, sine wave, doublet), mass of the vehicle, a unique identifier of the vehicle, an indication of whether a test was completed or aborted by an operator, and/or the like.

In various embodiments, an operator may provide one or more annotations via a user interface during execution of the selected test. The annotations may include one or more notes, comments, or other inputs relating to the autonomous vehicle's performance or operation during execution of the selected test. An operator may provide one or more annotations using a user interface such as, for example, the user interface illustrated in FIG. 5. The autonomous vehicle may generate metadata that includes at least a portion of the annotations provided by an operator.

An autonomous vehicle may detect one or more operator interventions that occur during execution of a selected test.

An operator intervention may be an occurrence when an operator assumes manual control over one or more operations of the autonomous vehicle. The autonomous vehicle may generate metadata that includes data associated with one or more detected operator interventions. This data may include, without limitation, a timestamp of when an operator obtained manual control, an indication of one or more actions that the operator performed during manual control, one or more sensor measurements and/or settings during the time of manual control, and/or the like. This data may include an indication of the method in which an operator took manual control, for example, via steering or brake. This information may be important to modify tests in case they were deemed useful and turned out not be because of, for example, test area limitations and/or the like.

The autonomous vehicle may log 418 at least a portion of the metadata to one or more log files. The log files may be the same log files as the ones to which response data is logged. Alternatively, metadata may be logged to different log files than those used to log response data.

The autonomous vehicle may transmit 420 at least a portion of the log files to an electronic device. In various embodiments, the autonomous vehicle may transmit 420 at least a portion of the log files to one or more electronic devices that are located remotely from the autonomous vehicle. The remote electronic device(s) may store 422 at least a portion of the response data and/or metadata included in the received log files in one or more data stores. This stored information is referred to below as "system data."

The system data may be stored along with an identifier associated with a test and/or a vehicle on which the test was executed. The system data may be stored along with a timestamp associated with the data. As described above, metadata for a test may include a start time for a test and an end time for the test. As such, any metadata associated with the test having a timestamp between the start time and the end time can be presumed to have been generated during the test.

In various embodiments, at least a portion of metadata may be stored in a format that is human-readable. At least a portion of metadata may be stored as a key-value pair structure. For instance, a test start time may be stored with the key "#test_start" and a value indicating the time, and a test end time may be stored with the key "#test_end" and a value indicating the time such as, for example:

test_start: 1332233.552
test_end: 133245.11

The test speed may be stored as follows with a key that shows the unit and value—test_speed_mps: 13.1.

In various embodiments, the process described by steps 404-422 may be performed for each test that is selected for an autonomous vehicle. Similarly, the process described by steps 400-420 may be performed by one or more autonomous vehicles in a fleet. As such, the system data stored by one or more of the remote electronic device(s) may include information pertaining to various tests ran by various autonomous vehicles across a fleet.

The system data may be mined for metadata that is generated during execution of one or more tests. For example, a system user may identify a specific test for one or more vehicles, and system data may be mined for metadata associated with the specified test from the one or more vehicles.

Figure 6:
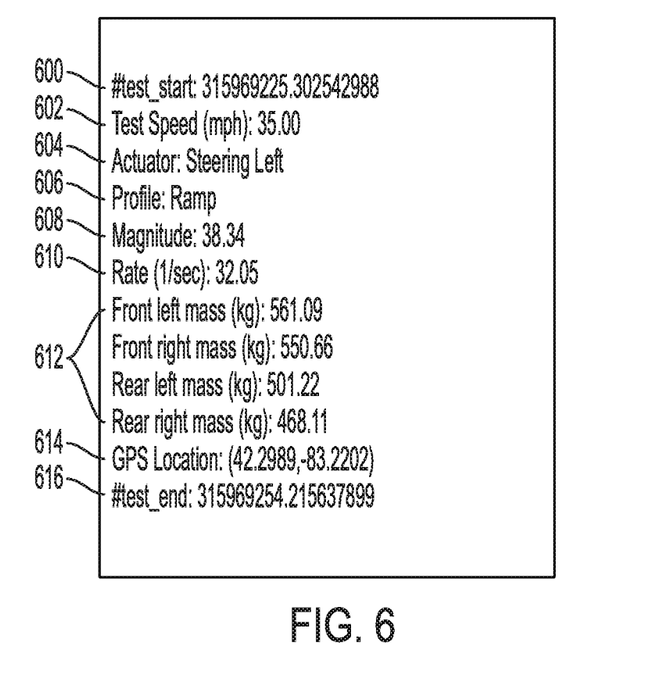
FIG. 6 illustrates example metadata associated with an example test.

FIG. 6 illustrates example metadata for an example steering actuation test at 35 mph with a ramp profile. The vehicle mass may be collected from an input by a test engineer and provided to the system. As illustrated by FIG. 6, vehicle mass information 612 may be embedded in the metadata. This information may be helpful for the system identification process. As also illustrated by FIG. 6, the metadata for this test may also include a start time of the test 600, a speed 602 at which the test is performed, actuator information 604, profile information 606, magnitude 608, rate 610, location information pertaining to the vehicle when the test is performed 614, and an end time of the test 616. It is understood that other metadata or other combinations of metadata may be used within the scope of this disclosure depending on the test that is run.

The system may identify at least a portion of metadata associated with the specified test. The system may identify one or more segments of response data that corresponds to the specified test based on the identified metadata. The system may identify one or more segments of response data that corresponds to the specified test using the start time and/or the end time documented by the metadata. For example, one or more tests may have a corresponding test start time and test end time pairings. One or more of the pairings may have accompanying description metadata that includes various information describing the test such as, for example, the test speed, the actuation type, the input profile, response data, and/or the like.

In various embodiments, the system may execute one or more parameter identification algorithms on one or more of the identified segments of response data to generate one or more parameter estimates that may be stored.

As an example, with respect to a powertrain system of an autonomous vehicle, the system may use a step input torque profile and record the longitudinal acceleration to identify one or more parameters. For instance, the system may identify how long after the input profile is sent that the powertrain reacts (the powertrain lag). As another example, the system may identify how long after the powertrain reacts that it achieves a certain percentage of the steady state value (the powertrain time constant). As yet another example, the system may identify a difference between the powertrain output and the steady state value of the input profile after a period of time (the powertrain steady state gain).

With respect to a steering system of an autonomous vehicle, the system may use ramp input of steering wheel angle request and record the measured steering wheel angle to identify one or more parameters. For instance, the system may identify how long after the profile is sent that the steering system reacts (steering lag). As another example, the system may identify how long after the steering system reacts that it achieves a certain percentage of the steady state value (the steering time constant). As yet another example, the system may identify a difference between the steering output and the steady state value of the input profile after a period of time (the steering steady state gain).

With respect to yaw inertia of an autonomous vehicle, the system may use sine wave inputs of steering wheel angle to identify the yaw inertia of the system (assuming a model structure for lateral dynamics).

With respect to tire stiffness, the system may use quasi-steady ramp inputs to the steering wheel angle to identify tire stiffness (which may indicate how much lateral force is generated by the tire).

Additional and/or alternate autonomous vehicle systems, inputs, parameters and/or measurements may be used within the scope of this disclosure.

In various embodiments, the system may leverage numerical optimization to identify one or more model parameters that best fit experimental data. Given a model structure, a set of experiments may be devised to collect data pertaining to the input and output values of the model. For example, a first order system with a pure time delay model may be assumed for a steering actuator model. The input being requested and the output being measured may be the steering wheel angle. Three parameters may need to be identified for this modeling—the gain, the time delay, and the time constant.

By collecting data from a set of experiments, a cost function may be determined and a numerical optimization may be used to identify values for the parameters that minimize the cost function. For instance, referring to the above example, a cost function may be determined for the steering actuator model and a numerical optimization may be used to identify values for the gain, the time delay, and the time constant parameters that minimize the cost function.

Figure 7:
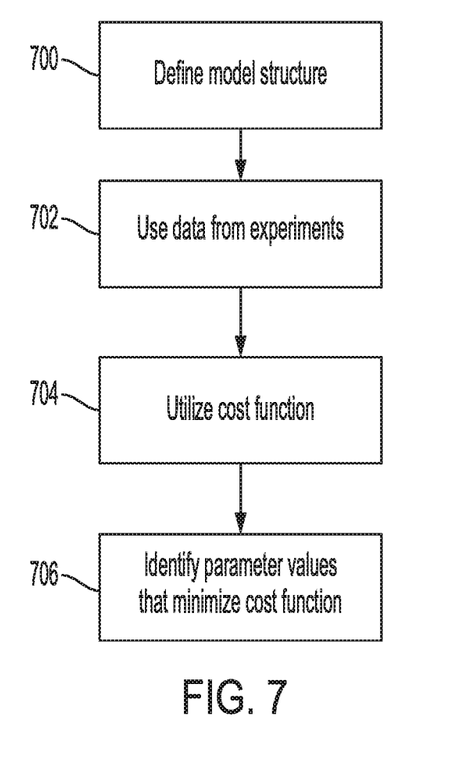
FIG. 7 illustrates a flow chart of an example method of performing parameter identification.

FIG. 7 illustrates a flow chart of an example method of performing parameter identification according to various embodiments. As shown in FIG. 7, a model structure may be defined 700. A model structure may be based on one or more first principles. The model structure may dictate one or more parameters to be identified.

The system may use 702 data from one or more experiments that capture the operating region of the model and collect relevant data for the model such as, for example, data pertaining to one or more of the identified parameters. The system may utilize 704 a cost function that represents how well the model should fit the data from the one or more experiments. In various embodiments, this cost function may be the sum of the squared error where the error is the difference between the measured output and the model output. The system may use a numerical optimization method to identify 706 the parameter values that minimize the cost function.

In various embodiments, the system may generate one or more reports pertaining to one or more of the parameter estimates. These reports may include one or more identified parameters of one or more models, test information (e.g., input profile, speed, actuator type, etc.), an indication of how well a model fits a particular data set given the identified parameters, information pertaining to the algorithm used (e.g., how many iterations ran, if the algorithm converged or not, and/or the like), one or more plots of a measured response and a simulated response using a model structure and one or more parameters. A report may include additional and/or alternate information within the scope of this disclosure.

Figure 8:
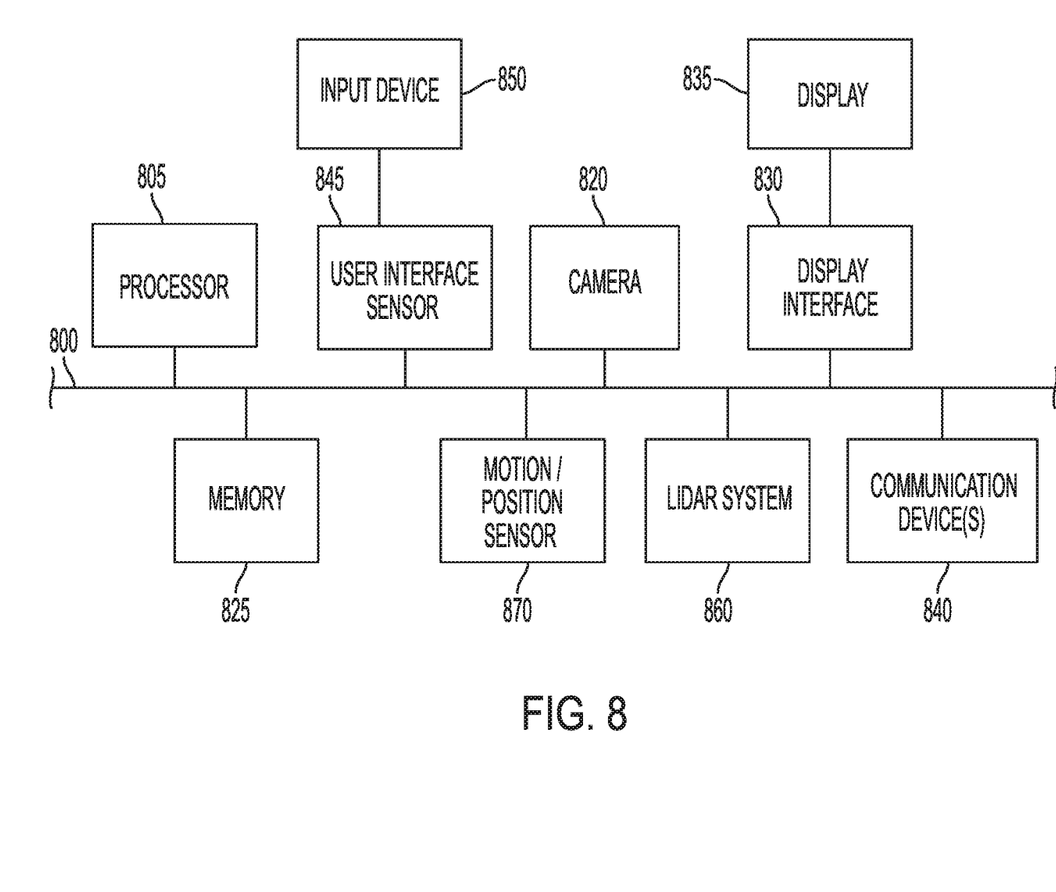
FIG. 8 is a block diagram that illustrates various elements of a possible electronic system, subsystem, controller and/or other component of an AV, and/or external electronic device.

FIG. 8 depicts an example of internal hardware that may be included in any of the electronic components of the system, such as internal processing systems of the AV, external monitoring and reporting systems, or remote servers. An electrical bus 800 serves as an information highway interconnecting the other illustrated components of the hardware. Processor 805 is a central processing device of the system, configured to perform calculations and logic operations required to execute programming instructions. As used in this document and in the claims, the terms "processor" and "processing device" may refer to a single processor or any number of processors in a set of processors that collectively perform a set of operations, such as a central processing unit (CPU), a graphics processing unit (GPU), a remote server, or a combination of these. Read only memory (ROM), random access memory (RAM), flash memory, hard drives and other devices capable of storing electronic data constitute examples of memory devices 825. A memory device may include a single device or a collection of devices across which data and/or instructions are stored. Various embodiments of the invention may include a computer-readable medium containing programming instructions that are configured to cause one or more processors, print devices and/or scanning devices to perform the functions described in the context of the previous figures.

An optional display interface 830 may permit information from the bus 800 to be displayed on a display device 835 in visual, graphic or alphanumeric format, such on an in-dashboard display system of the vehicle. An audio interface and audio output (such as a speaker) also may be provided. Communication with external devices may occur using various communication devices 840 such as a wireless antenna, a radio frequency identification (RFID) tag and/or short-range or near-field communication transceiver, each of which may optionally communicatively connect with other components of the device via one or more communication systems. The communication device(s) 840 may be configured to be communicatively connected to a communications network, such as the Internet, a local area network or a cellular telephone data network.

The hardware may also include a user interface sensor 845 that allows for receipt of data from input devices 850 such as a keyboard or keypad, a joystick, a touchscreen, a touch pad, a remote control, a pointing device and/or microphone. Digital image frames also may be received from a camera 820 that can capture video and/or still images. The system also may receive data from a motion and/or position sensor 870 such as an accelerometer, gyroscope or inertial measurement unit. The system also may receive data from a LiDAR system 860 such as that described earlier in this document.

The above-disclosed features and functions, as well as alternatives, may be combined into many other different systems or applications. Various components may be implemented in hardware or software or embedded software. Various presently unforeseen or unanticipated alternatives, modifications, variations or improvements may be made by those skilled in the art, each of which is also intended to be encompassed by the disclosed embodiments.

Terminology that is relevant to the disclosure provided above includes:

An "automated device" or "robotic device" refers to an electronic device that includes a processor, programming instructions, and one or more components that based on commands from the processor can perform at least some operations or tasks with minimal or no human intervention. For example, an automated device may perform one or more automatic functions or function sets. Examples of such operations, functions or tasks may include without, limitation, navigation, transportation, driving, delivering, loading, unloading, medical-related processes, construction-related processes, and/or the like. Example automated devices may include, without limitation, autonomous vehicles, drones and other autonomous robotic devices.

The term "classifier" means an automated process by which an artificial intelligence system may assign a label or category to one or more data points. A classifier includes an algorithm that is trained via an automated process such as machine learning. A classifier typically starts with a set of labeled or unlabeled training data and applies one or more algorithms to detect one or more features and/or patterns within data that correspond to various labels or classes. The algorithms may include, without limitation, those as simple as decision trees, as complex as Naïve Bayes classification, and/or intermediate algorithms such as k-nearest neighbor. Classifiers may include artificial neural networks (ANNs), support vector machine classifiers, and/or any of a host of different types of classifiers. Once trained, the classifier may then classify new data points using the knowledge base that it learned during training. The process of training a classifier can evolve over time, as classifiers may be periodically trained on updated data, and they may learn from being provided information about data that they may have misclassified. A classifier will be implemented by a processor executing programming instructions, and it may operate on large data sets such as image data, LiDAR system data, sensor data, and/or other data.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle. Autonomous vehicles also include vehicles in which autonomous systems augment human operation of the vehicle, such as vehicles with driver-assisted steering, speed control, braking, parking and other systems.

In this document, the terms "street," "lane" and "intersection" are illustrated by way of example with vehicles traveling on one or more roads. However, the embodiments are intended to include lanes and intersections in other locations, such as parking areas. In addition, for autonomous vehicles that are designed to be used indoors (such as automated picking devices in warehouses), a street may be a corridor of the warehouse and a lane may be a portion of the corridor. If the autonomous vehicle is a drone or other aircraft, the term "street" may represent an airway and a lane may be a portion of the airway. If the autonomous vehicle is a watercraft, then the term "street" may represent a waterway and a lane may be a portion of the waterway.

As used in this document, the term "light" means electromagnetic radiation associated with optical frequencies, e.g., ultraviolet, visible, infrared and terahertz radiation. Example emitters of light include laser emitters and other emitters that emit converged light. In this document, the term "emitter" will be used to refer to an emitter of light, such as a laser emitter that emits infrared light.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

In this document, the terms "communication link" and "communication path" mean a wired or wireless path via which a first device sends communication signals to and/or receives communication signals from one or more other devices. Devices are "communicatively connected" if the devices are able to send and/or receive data via a communication link. "Electronic communication" refers to the transmission of data via one or more signals between two or more electronic devices, whether through a wired or wireless network, and whether directly or indirectly via one or more intermediary devices.

In this document, when relative terms of order such as "first" and "second" are used to modify a noun, such use is simply intended to distinguish one item from another, and is not intended to require a sequential order unless specifically stated.

In addition, terms of relative position such as "vertical" and "horizontal", or "front" and "rear", when used, are intended to be relative to each other and need not be absolute, and only refer to one possible position of the device associated with those terms depending on the device's orientation. When this document uses the terms "front," "rear," and "sides" to refer to an area of a vehicle, they refer to areas of vehicle with respect to the vehicle's default area of travel. For example, a "front" of an automobile is an area that is closer to the vehicle's headlamps than it is to the vehicle's tail lights, while the "rear" of an automobile is an area that is closer to the vehicle's tail lights than it is to the vehicle's headlamps. In addition, the terms "front" and "rear" are not necessarily limited to forward-facing or rear-facing areas but also include side areas that are closer to the front than the rear, or vice versa, respectively. "Sides" of a vehicle are intended to refer to side-facing sections that are between the foremost and rearmost portions of the vehicle.

The invention claimed is:

1. A method of testing an autonomous vehicle, the method comprising:
   by an on-board computing system of the autonomous vehicle:
      obtaining a list of one or more required tests the autonomous vehicle is to run, wherein each of the one or more required tests is part of a commissioning process for the autonomous vehicle;
      causing the list to be displayed on a display device of the autonomous vehicle;
      receiving a selection of an identifier for a selected test and an input for starting speed control from an operator of the autonomous vehicle;
      controlling the autonomous vehicle to reach a particular speed that is to be attained before the selected test can be performed;
      receiving a user-software interaction to cause instructions for the selected test to be obtained from an electronic device located remote from the autonomous vehicle, responsive to the autonomous vehicle reaching the particular speed;

generating a request for a test input profile associated with the selected test, responsive to the user-software interaction;

communicating the request for the test input profile from the autonomous vehicle to the electronic device located remote from the autonomous vehicle;

receiving the test input profile from the electronic device, wherein the test input profile comprises the instructions for the autonomous vehicle to execute to perform the selected test;

causing the autonomous vehicle to execute at least a portion of the one or more instructions of the test input profile;

logging response data to one or more log files, wherein the response data comprises data measuring the autonomous vehicle's autonomous response to executing the at least a portion of the one or more instructions of the selected test;

during execution of the one or more test instructions, generating metadata associated with the selected test, wherein the metadata comprises a start timestamp that corresponds to a time when the selected test begins and an end timestamp that corresponds to a time when the selected test ends;

logging the metadata to the one or more log files;

transmitting at least a portion of the one or more log files to an electronic device located remotely from the autonomous vehicle; and receiving parameters representing physical properties of vehicle motion that were identified for a plurality of models that are to be relied upon by the on-board computing system for autonomous motion control of the autonomous vehicle, the parameters being identified based on at least one segment of the response data associated with a timestamp falling within a range defined by the start and end timestamps associated with the selected test;

wherein the plurality of models comprise models of physical components of the autonomous vehicle and models of motion responses by the autonomous vehicle.

2. The method of claim 1, wherein the metadata comprises a test type associated with the selected test.

3. The method of claim 1, wherein the metadata comprises an indication that the selected test is part of the commissioning process.

4. The method of claim 1, further comprising:

receiving, from an operator, at least one annotation relating to autonomous operational performance by the autonomous vehicle during execution of the selected test; and logging as part of the metadata the at least one annotation.

5. The method of claim 1, further comprising:

detecting one or more operation interventions that occur during execution of the one or more test instructions; and logging data associated with each operation invention as part of the metadata.

6. The method of claim 1, further comprising simulating an autonomous response of the autonomous vehicle using a simulation model built from at least one of the plurality of models and at least one of the parameters which were identified based on the at least one segment of the response data logged during performance of the selected test.

7. The method of claim 1, further comprising:

detecting metadata associated with the selected test;

identifying the at least one segment of the response data using contents of the metadata; and executing one or more parameter identification algorithms on the at least one segment of the response data to identify the parameters for the plurality of models which comprise models of physical components of the autonomous vehicle and models of motion responses by the autonomous vehicle.

8. The method of claim 7, further comprising identifying a value for at least one of the parameters that minimizes a cost function determined for a respective model of the plurality of models, where the cost function is at least partially defined by a difference between a measured value contained in the at least one segment and a value output from the respective model.

9. A system for testing an autonomous vehicle, the system comprising:

an on-board computing system of the autonomous vehicle comprising an electronic device; and a computer-readable storage medium comprising one or more programming instructions that, when executed, cause the electronic device to:

obtain a list of one or more required tests the autonomous vehicle is to run, wherein each of the one or more required tests is part of a commissioning process for the autonomous vehicle;

cause the list to be displayed on a display device of the autonomous vehicle;

receive a selection of an identifier for a selected test and an input for starting speed control from an operator of the autonomous vehicle;

control the autonomous vehicle to reach a particular speed that is to be attained before the selected test can be performed;

receive a user-software interaction to cause instructions for the selected test to be obtained from an electronic device located remote from the autonomous vehicle, responsive to the autonomous vehicle reaching the particular speed;

generate a request for a test input profile associated with the selected test, responsive to the user-software interaction;

communicate the request for the test input profile from the autonomous vehicle to the electronic device located remote from the autonomous vehicle;

receive the test input profile from the electronic device, wherein the test input profile comprises the instructions for the autonomous vehicle to execute to perform the selected test;

cause the autonomous vehicle to execute at least a portion of the one or more instructions of the test input profile;

log response data to one or more log files, wherein the response data comprises data measuring the autonomous vehicle's autonomous response to executing the at least a portion of the one or more instructions of the selected test;

during execution of the one or more test instructions, generate metadata associated with the selected test, wherein the metadata comprises a start timestamp that corresponds to a time when the selected test begins and an end timestamp that corresponds to a time when the selected test ends;

log the metadata to the one or more log files;

transmit at least a portion of the one or more log files to a first electronic device located remotely from the autonomous vehicle; and receive parameters representing physical properties of vehicle motion that were identified for a plurality of models that are to be relied upon by the on-board computing system for autonomous motion control of the autonomous vehicle, the parameters being identified based on at least one segment of the response data associated with a timestamp falling within a range defined by the start and end timestamps associated with the selected test;

wherein the plurality of models comprise models of physical components of the autonomous vehicle and models of motion responses by the autonomous vehicle.

10. The system of claim 9, wherein the metadata comprises a test type associated with the selected test.

11. The system of claim 9, wherein the metadata comprises an indication that the selected test is part of the commissioning process.

12. The system of claim 9, wherein the computer-readable storage medium further comprises one or more programming instructions that, when executed, cause the electronic device to log as part of the metadata one or more annotations received from the operator during execution of the selected test.

13. The system of claim 9, wherein the computer-readable storage medium further comprises one or more programming instructions that, when executed, cause the electronic device to:
   detect one or more operation interventions that occur during execution of the one or more test instructions; and
   log data associated with each operation invention as part of the metadata.

14. The system of claim 9, further comprising storing, by a second electronic device located remotely from the autonomous vehicle, at least a portion of the received response data and at least a portion of the metadata in one or more data stores.

15. The system of claim 9, wherein the computer-readable storage medium further comprises one or more programming instructions that, when executed, cause the electronic device to:
   detect metadata associated with the selected test;
   identify the at least one segment of the response data using contents of the metadata; and
   execute one or more parameter identification algorithms on the at least one segment of the response data to identify the parameters for the plurality of models.

16. The system of claim 15, wherein the one or more programming instructions that, when executed, cause the electronic device to further identify a value for at least one of the parameters that minimizes a cost function determined for a respective model of the plurality of models, where the cost function is at least partially defined by a difference between a measured value contained in the at least one segment and a value output from the respective model.

17. A computer program product comprising a memory and programming instructions that are configured to cause a processor to:

obtain a list of one or more required tests that an autonomous vehicle is to run, wherein each of the one or more required tests is part of a commissioning process for the autonomous vehicle;

cause the list to be displayed on a display device of the autonomous vehicle;

receive a selection of a selected test and an input for starting speed control from an operator of the autonomous vehicle;

control the autonomous vehicle to reach a particular speed that is to be attained before the selected test can be performed;

receive a user-software interaction to cause instructions for the selected test to be obtained from an electronic device located remote from the autonomous vehicle, responsive to the autonomous vehicle reaching the particular speed;

generate a request for a test input profile associated with the selected test, responsive to the user software interaction;

communicate the request for the test input profile from the autonomous vehicle to the electronic device located remote from the autonomous vehicle;

receive the test input profile from the electronic device, wherein the test input profile comprises the instructions for the autonomous vehicle to execute to perform the selected test;

cause the autonomous vehicle to execute at least a portion of the one or more instructions of the test input profile;

log response data to one or more log files, wherein the response data comprises data measuring the autonomous vehicle's autonomous response to executing the at least a portion of the one or more instructions of the selected test;

during execution of the one or more test instructions, generate metadata associated with the selected test, wherein the metadata comprises a start timestamp that corresponds to a time when the selected test begins and an end timestamp that corresponds to a time when the selected test ends;

log the metadata to the one or more log files;

transmit at least a portion of the one or more log files to an electronic device located remotely from the autonomous vehicle; and receive parameters representing physical properties of vehicle motion that were identified for a plurality of models that are to be relied upon by the on-board computing system for autonomous motion control of the autonomous vehicle, the parameters being identified based on at least one segment of the response data associated with a timestamp falling within a range defined by the start and end timestamps associated with the selected test;

wherein the plurality of models comprise models of physical components of the autonomous vehicle and models of motion responses by the autonomous vehicle.

* * * * *

UNITED STATES PATENT AND TRADEMARK OFFICE
CERTIFICATE OF CORRECTION

| | |
|---|---|
| PATENT NO. | : 11,755,469 B2 |
| APPLICATION NO. | : 17/030702 |
| DATED | : September 12, 2023 |
| INVENTOR(S) | : Ghassan Atmeh |

It is certified that error appears in the above-identified patent and that said Letters Patent is hereby corrected as shown below:

In the Claims

At Column 19, Claim number 13, Line number 8, should read:
13. The system of claim 9, wherein the computer-readable storage medium further comprises one or more programming instructions that, when executed, cause the electronic device to: detect one or more operation interventions that occur during execution of the one or more test instructions; and log data associated with each operation intervention as part of the metadata.

Signed and Sealed this
Fourteenth Day of November, 2023

*Katherine Kelly Vidal*

Katherine Kelly Vidal
*Director of the United States Patent and Trademark Office*